Figure 1:
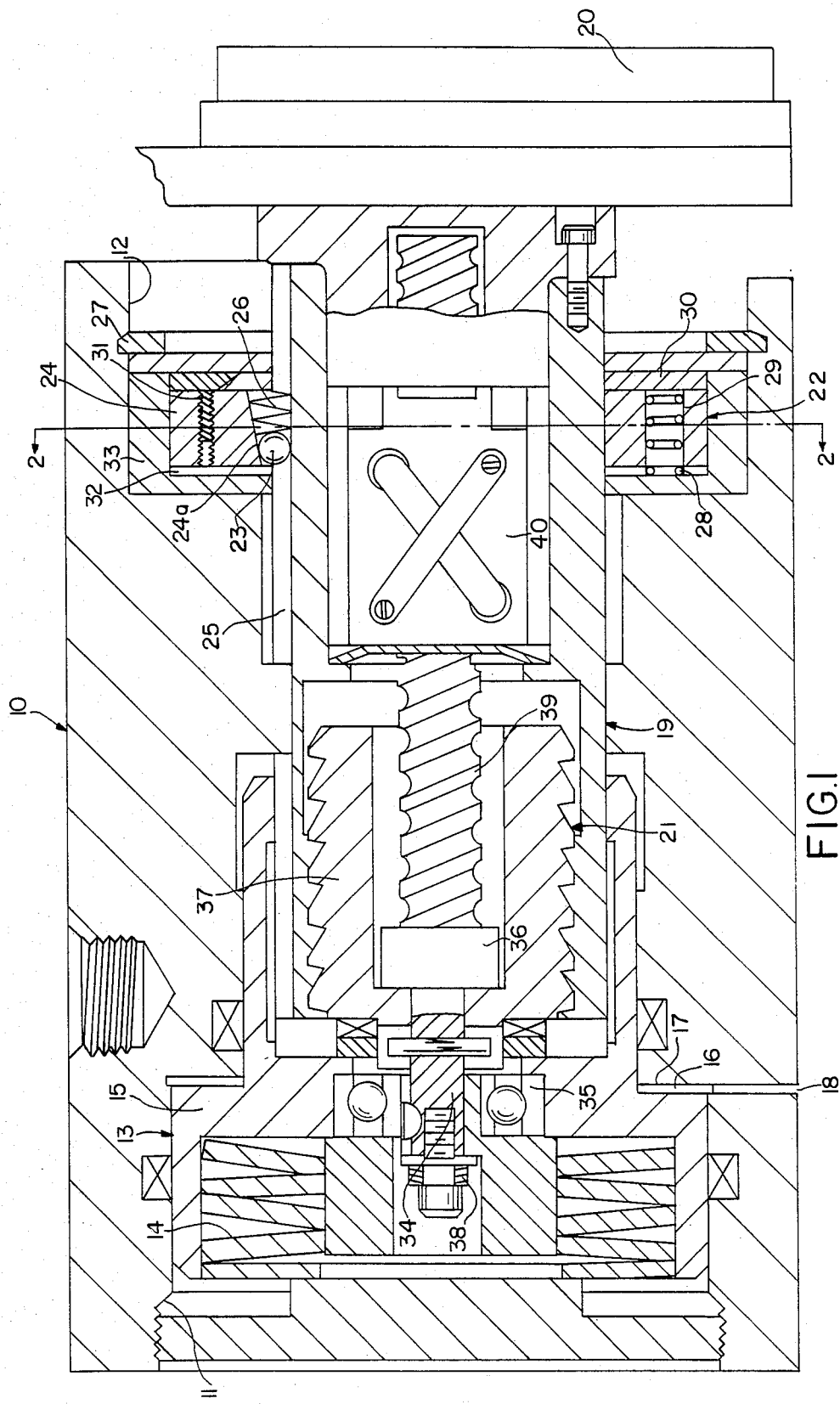

United States Patent [19]
Dill

[11] Patent Number: 4,867,283
[45] Date of Patent: Sep. 19, 1989

[54] RAMP/ROLLER SLACK ADJUSTER

[75] Inventor: Michael J. Dill, Watertown, N.Y.

[73] Assignee: General Signal Corporation, Stamford, Conn.

[21] Appl. No.: 210,535

[22] Filed: Jun. 22, 1988

[51] Int. Cl.⁴ .................... F16D 65/38; F16D 65/24
[52] U.S. Cl. .................... 188/196 D; 188/170
[58] Field of Search .................... 188/71.9, 170, 203, 188/79, 62, 196 D

[56] References Cited

U.S. PATENT DOCUMENTS

| | | | |
|---|---|---|---|
| 2,861,658 | 11/1958 | Bourat-Martin | 188/196 D |
| 3,661,230 | 5/1972 | Burnett | 188/196 D X |
| 3,833,095 | 9/1974 | Engle | 188/71.9 |
| 4,014,413 | 3/1977 | Monks | 188/170 |
| 4,211,310 | 7/1980 | Lupertz | 188/71.9 X |

FOREIGN PATENT DOCUMENTS

| | | | |
|---|---|---|---|
| 2239602 | 2/1973 | Fed. Rep. of Germany | 188/196 D |
| 2330949 | 1/1974 | Fed. Rep. of Germany | 188/196 D |
| 3410249 | 9/1985 | Fed. Rep. of Germany | 188/71.9 |
| 0666332 | 6/1979 | U.S.S.R. | 188/79.62 |
| 1076659 | 2/1984 | U.S.S.R. | 188/170 |
| 2063399 | 6/1981 | United Kingdom | 188/196 D |
| 2080894 | 2/1982 | United Kingdom | 188/79.62 |

Primary Examiner—Andres Kashnikow
Assistant Examiner—Richard Potosnak
Attorney, Agent, or Firm—Robert R. Hubbard; Harold S. Wynn

[57] ABSTRACT

A slack adjustable operator for a spring applied disc brake has a spring motor operating a disc brake through a tubular pushrod having an over-running clutch permitting axial movement of the pushrod in a brake application direction, but not in a brake releasing direction. The over-running clutch operates in longitudinal load roller slots in the outer periphery of the pushrod and having a ramp load roller retaining ring slidable laterally on the outer periphery of the pushrod, the retainer ring being retained in a stepped bore of a housing to be laterally operable, along with longitudinal operation of the pushrod for brake release only to an extent to provide normal clearance for pads of the brakes, this limitation being effective to initiate threaded slack adjustment of the pushrod to compensate for wear of the brake pads.

1 Claim, 2 Drawing Sheets

RAMP/ROLLER SLACK ADJUSTER

BACKGROUND

This invention relates to slack adjustment for disc brakes and it more perfectly relates to clutch control means for selectively rendering the slack adjustment effective for a spring applied disc brake for railroad cars.

Prior art disc brake operators apply spring force, or fluid pressure, to disc brakes through an axially operable pushrod that has its length automatically adjustable to compensate for wear of brake pads by selective operation of a threaded adjustment. Such an operator is disclosed, for example, in the U.S. Erdman Pat. No. 3,592,299, issued July 13, 1971. In this patent, a pushrod is retracted upon release of fluid pressure for releasing the brake for a distance sufficient for normal pad clearance by resiliency of rubber packing contained in a slot acting on the periphery of the pushrod. After this limited retraction of the pushrod, a threaded slack adjustor is activated to correct for wear of a brake pad. Such dependence upon resiliency and friction of the rubber packing has its limitations for railroad use, particularly because of changes in environment of use of the brake operator over a period of time.

An object of the present invention is to provide improved operation of disc brakes which substantially obviates one or more of the limitations and disadvantages of the described prior art systems.

Another object of the present invention is to provide an improved slack adjustable operator for disc brakes that is more positive and accurate in its compensation for wear of brake pads.

Another object of the present invention is to provide an improved slack adjustable operator for disc brakes that is simplified and less expensive to manufacture than prior art devices.

SUMMARY

A slack adjustable operator for a spring applied disc brake according to the present invention comprises a housing having first and second adjoining stepped bores, the first of which houses a spring motor having a piston operable by fluid pressure to selectively compress and release Bellville springs for respectively operating a tubular pushrod axially to release and apply a disc brake.

A one way clutch has a ring slidably disposed on the pushrod and within the second stepped bore having limited axial movement and carrying load rollers which operate in spaced longitudinal slots formed in the outer periphery of the tubular pushrod. The clutch has a ramp ring slidable on the pushrod having transversed ramp slots for the rollers that cooperate with the longitudinal slots of the pushrod to form a raceway for the load rollers. The rollers are spring biased in the ramp raceways in a direction to lock the pushrod to the clutch for movement of the pushrod in a brake releasing direction, but not in a brake application direction. The clutch is permitted to move laterally in the stepped bore a distance corresponding to release movement required of the pushrod for obtaining a normal clearance for pads of the disc brake. A shoulder of the housing in the second stepped bore stops further axial movement of both the clutch and the pushrod, and continued movement of the piston turns a threaded slack adjustment connecting the piston to the pushrod as required to compensate for wear of the brake pads.

For a better understanding of the present invention, together with other and further object thereof, reference is had to the following description taken in connection with the accompanying drawings, while its scope will be pointed out in the appending claims.

IN THE DRAWINGS

Figure 2:
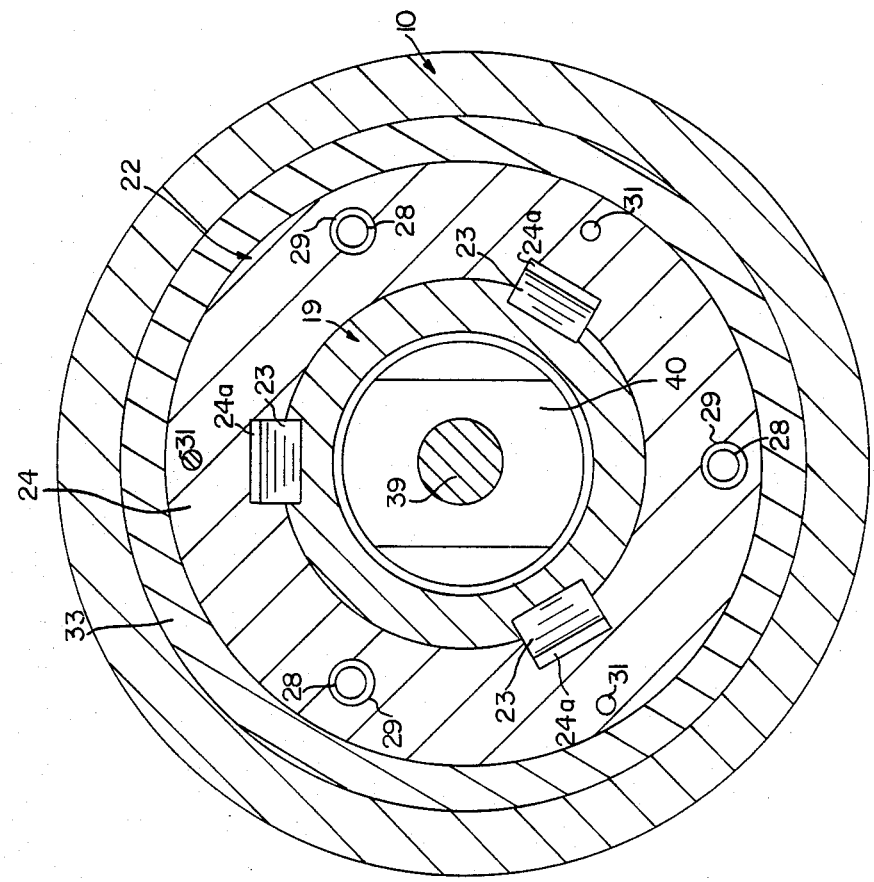

FIG. 1 is a sectional view of a slack adjustable operator for a disc brake according to a preferred embodiment of the present inventon; and FIG. 2 is a sectional view taken along the line 2—2 of FIG. 1.

With reference to FIG. 1 a slack adjustable operator for a disc brake is illustrated as having a housing 10 having first and second end-to-end adjoining stepped bores 11 and 12 formed therein. The first step bore 11 houses a spring motor 13 having Bellville springs 14 contained in the left-hand end of a piston 15, and a fluid pressure chamber 16 is formed between the piston 15 and an abutment 17 in the first stepped bore 11 for selectively compressing and releasing the force of the Bellville springs. Fluid pressure is supplied to the chamber 16 through a port 18.

A pushrod 19 is provided for operably connecting the spring motor 13 to a brake pad 20. The spring motor 13 is connected to a pushrod 19 through a slack adjustor 21. A one way roller clutch 22 has a plurality of rollers 23 that operate in longitudinal keyways 25 in the pushrod 19. The rollers 23 are normally wedged between a retaining ring 24 and the pushrod 19 to prevent movement of the pushrod to the left independent of the retainer ring 24, but to permit movement to the right because of a taper in the innerrace 24a of the ramp ring 24. With reference to FIG. 1, the rollers 23 are biased to a locking position by springs 26.

With reference to FIGS. 1 and 2, the ramp ring 24 is biased laterally in a right-hand direction against a snap ring 27 secured in the housing 10 by coil springs 28 in three lateral bores 29 in the ramp ring 24. The springs 26 and 28 react against a face plate 30 that is preferably detachably attached to the right-hand face of the ramp ring 24 by screws 31. The ramp ring 24 is laterally operable through a space 32 with movement of the tubular pushrod 19 to the left upon release of the brakes. This space 32 corresponds to normal clearance required for the brake pad 20, which may be about 0.050 of an inch. The second stepped bore 12 in the housing 10 is illustrated as having a cup shaped lining 33 secured therein for journalling the same ring 24.

Having thus considered the general structure of a slack adjustable operator according to a preferred embodiment of the present invention, consideration will now be given to the mode of operation under typical operating conditions.

BRAKE APPLICATION

The condition of the apparatus as illustrated is with the brakes released, wherein the Bellville springs 14 are compressed by operation of the piston 15 to the left by fluid pressure in the chamber 16. Under these conditions, the slack adjustor 21 has operated to compensate for prior wear of the brake pads 20. To apply the brakes, the chamber 16 is vented of fluid pressure as through the port 18, and the Bellville springs 14 force the piston 15 to the right to drive the pushrod 19 for applying the force of the Bellville springs 14 to the brake pad 20 through the slack adjustor 21. Movement of the pushrod 19 to the right under these conditions operates the rollers 23 to the right to move the pushrod 19 relative to the ramp ring 24 that is restrained from axial movement to the right by the snap ring 27. Thus the full force of the Bellville springs is applied to the brake pad 20.

RELEASE OF THE BRAKES

To release the brakes, fluid pressure is applied in chambers 16 to operate the piston 15 to the left to compress the Bellville springs 14. This draws the pushrod 19 to the left through its connection to the piston 15 through a stud 34 that is journaled by a ball bearing 35 having its outer race secured in the piston 15. The stud 34 is connected to a head 36 that bears against a nut 37 that is threaded into internal buttress threads 19a in the inner periphery of the tubular pushrod 19. This draws the pushrod 19 to the left along with the linear one-way clutch 22 because the pushrod 19 cannot move to the left without taking the linear clutch 22 with it. The linear one-way clutch 22 and the pushrod 19 are prevented by the second bore of the housing 10 from moving more than the distance that is required for normal clearance of the brake pad 20. At this time, if there has been no wear in the brake pad 20, the piston 15 has reached its point of maximum compression of the Bellville spring 14 and the brake releasing operation has been completed.

If there has been wear in the pad 20 during brake application, upon the next following release of the brakes, the piston 15 moves further to the left to compress the Bellville spring 14 after the right-hand end of the pushrod 19 has reached its limit of operation. At this time, the nut 38 on shaft 34 draws a ball lead screw 39 from the nut 40, which causes rotation of the buttress thread nut 37 in a direction to provide elongation of the pushrod 19 to compensate for the wear on the brake pad 20.

Having thus described a slack adjustable operator for a spring applied disc brake as a referred embodiment of the present invention, it is to be understood that various modifications and alterations may be made to the specific embodiment shown without departing from the spirit or scope of the present invention.

I claim:
1. A slack adjustable operator for a spring applied disc brake comprising;

(a) a housing having first and second end-to-end coaxial stepped bores,
(b) a spring motor in the first stepped bore having a piston operable by fluid pressure to selectively compress and release Bellville springs for respectively releasing and applying force to a disc brake,
(c) a tubular pushrod adapted to operably connect the Bellville springs to the disc brake, the pushrod having a plurality of longitudinal keyways formed therein,
(d) The Bellville springs being connected to the pushrod through a slack adjuster having a buttress nut with external buttress threads cooperating with complimentary internal threads at one end of the pushrod, the nut being rotated by axial movement of a ball screw relative to a ball nut for rotating the buttress nut, and
(e) a one-way roller clutch having a retainer ring axially operable on the outer periphery of the pushrod within the second stepped bore in the housing for preventing axial movement of the pushrod relative to the clutch during brake release, but not during brake application,
(f) the retainer ring being axially movable in the second stepped bore of the housing to an extent to permit axial movement of the associated pushrod for normal clearance of the disc brake and
(g) the retaining ring being loosely journalled to slide axially on the periphery of the pushrod during brake application but having ramp slots formed therein and tapered in a brake releasing direction for wedging respective rollers in the keyways of the pushrod to lock axial movement of the pushrod in a brake releasing direction except as limited by axial movement of the retainer ring, the keyways also preventing rotation of the retaining ring on the pushrod,
(h) the retaining ring having a face plate secured to one side thereof for retaining springs in positions for biasing the rollers into a wedging position with the keyways of the pushrod,
(i) the retaining ring having a plurality of transverse bores and coil springs contained therein for biasing the retaining ring laterally in the second, stepped bore in a direction to ensure a full measured clearance release movement for the pushrod before permitting slack adjustment to be made,
(j) the measured clearance being approximately fifty thousandths of an inch.

* * * * *